United States Patent [19]

DiRisio

[11] Patent Number: 5,319,407
[45] Date of Patent: Jun. 7, 1994

[54] FILM CASSETTE WITH INTERACTING SPOOL LOCK AND LIGHT SHIELD

[75] Inventor: Anthony DiRisio, Rochester, N.Y.

[73] Assignee: Eastman Kodak Company, Rochester, N.Y.

[21] Appl. No.: 78,671

[22] Filed: Jun. 16, 1993

[51] Int. Cl.5 ............................................. G03B 17/26
[52] U.S. Cl. .................................. 354/275; 242/71.1; 242/71.8
[58] Field of Search .................. 354/275, 277; 242/71, 242/71.1, 71.8

[56] References Cited

U.S. PATENT DOCUMENTS

| | | | |
|---|---|---|---|
| 2,614,763 | 10/1952 | Horton et al. | 242/71 |
| 4,221,479 | 9/1980 | Harvey | 354/275 |
| 5,115,268 | 5/1992 | Kitagawa et al. | 354/275 |
| 5,209,419 | 5/1993 | Zander | 354/275 X |

FOREIGN PATENT DOCUMENTS

4002788A1  8/1990  European Pat. Off. ..... G03B 17/26

Primary Examiner—Michael L. Gellner
Assistant Examiner—J. K. Han
Attorney, Agent, or Firm—Roger A. Fields

[57] ABSTRACT

A film cassette comprises a rotatable film spool, a light shield for preventing ambient light from entering the cassette interior, and a locking pawl movable into engagement with the spool to inhibit rotation of the spool but being forced out of engagement with the spool when the spool is rotated. According to the invention, the light shield is movable to open and the locking pawl is arranged to move the light shield to open responsive to the locking pawl being forced out of engagement with the spool when the spool is rotated.

6 Claims, 3 Drawing Sheets

FILM CASSETTE WITH INTERACTING SPOOL LOCK AND LIGHT SHIELD

FIELD OF THE INVENTION

This invention relates generally to the field of photography, and in particular to film cassettes. More specifically, the invention relates to a film cassette with a spool lock for preventing unintended rotation of a film spool and a light shield for preventing ambient light from entering the cassette interior.

BACKGROUND OF THE INVENTION

A film cassette with a spool lock for preventing unintended rotation of the film spool and a light shield for preventing ambient light from entering the cassette interior is known in the prior art. U.S. Pat. No. 5,115,268 issued May 19, 1992 discloses a film cassette comprising a light-trapping plush for preventing ambient light from entering the cassette interior through a film egress/ingress passageway, a film spool supported for rotation in film unwinding and film winding directions, and a locking pawl supported for movement into engagement with the spool to secure the spool and out of engagement with the spool to release the spool. The spool has a coaxial ratchet wheel with asymmetrically shaped teeth. The locking pawl appears to be a rigid beam member which is pivotally mounted at one end and has an asymmetrically shaped detent portion at an opposite end. A curved spring arm portion of the locking pawl extends from the end of the rigid beam member that has the detent portion, to bias the detent portion to between any two adjacent ones of the teeth in order to secure the spool. To remove the detent portion from between the two adjacent teeth, an engagement release portion of the locking pawl is turned to pivot the rigid beam member against the contrary urging of the spring arm portion. The engagement release portion then is held in the turned-to position to maintain the detent portion separated from the ratchet wheel. When the engagement release portion is released, the spring arm portion is free to pivot the rigid beam member to return the detent portion to between any two adjacent ones of the teeth in order to re-secure the spool. Since the teeth and the detent portion are asymmetrically shaped, it appears that the locking pawl can be temporarily forced out of engagement with the spool against the contrary urging of the spring arm portion when the spool is rotated in a winding direction.

PROBLEMS TO BE SOLVED BY THE INVENTION

In prior art U.S. Pat. No. 5,115,268, the film cassette is of the type that is capable of advancing a non-protruding film leader outwardly from the cassette interior when the film spool is rotated in the unwinding direction. However, it is possible that the leading end of the film leader will stub against the light-trapping plush, in which instance the film leader cannot be advanced out of the cassette interior. Moreover, should the film leader be moved out of and back into the cassette interior several times, this may cause the plush to lose its effectiveness as a light-trapping means.

SUMMARY OF THE INVENTION

According to the invention, a film cassette comprising a rotatable film spool, a light shield for preventing ambient light from entering the cassette interior, and a locking pawl movable into engagement with the spool to inhibit rotation of the spool but being forced out of engagement with the spool when the spool is rotated, is characterized in that:

the light shield is movable to open; and the locking pawl is arranged to move the light shield to open responsive to the locking pawl being forced out of engagement with the spool when the spool is rotated.

ADVANTAGEOUS EFFECTS OF THE INVENTION

By supporting the light shield for opening movement, it is assured that the leading end of a film leader can be freely advanced outwardly from the cassette interior as compared to possibly stubbing on a light-trapping plush as in prior art U.S. Pat. No. 5,115,268. Moreover, should the film leader be moved out of and back into the cassette interior several times, this will not cause the light shielding to lose any effectiveness (when it is closed) to prevent ambient light from entering the cassette interior as in the case of the light-trapping plush.

DETAILED DESCRIPTION OF THE INVENTION

The invention is disclosed as being embodied preferably in a film cassette. Because the features of a film cassette are generally known, the description which follows is directed in particular only to those elements forming part of or cooperating directly with the disclosed embodiment. It is to be understood, however, that other elements may take various forms known to a person of ordinary skill in the art.

Figure 1:
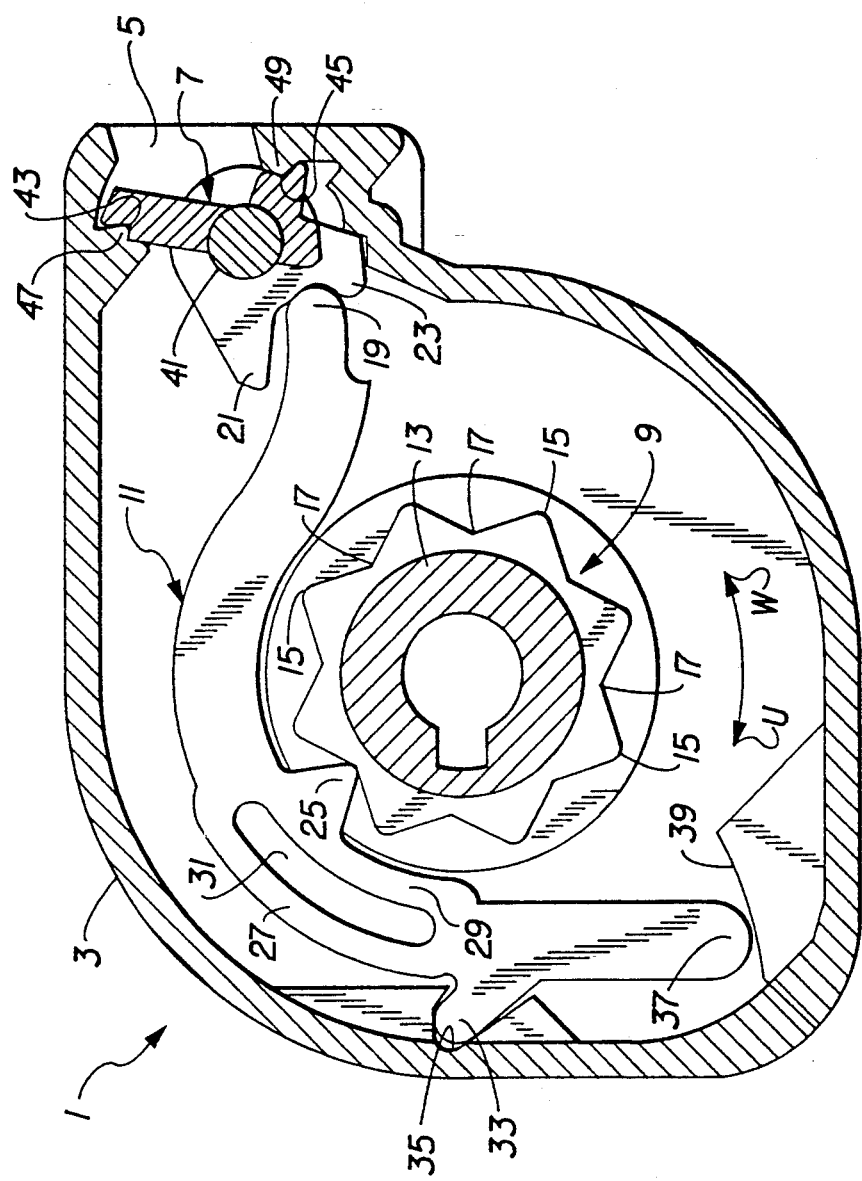
FIG. 1 is a sectional view of a film cassette with a locking pawl and a light shield according to a preferred embodiment of the invention, showing the locking pawl in engagement with a film spool and the light shield completely closed.
Figure 2:
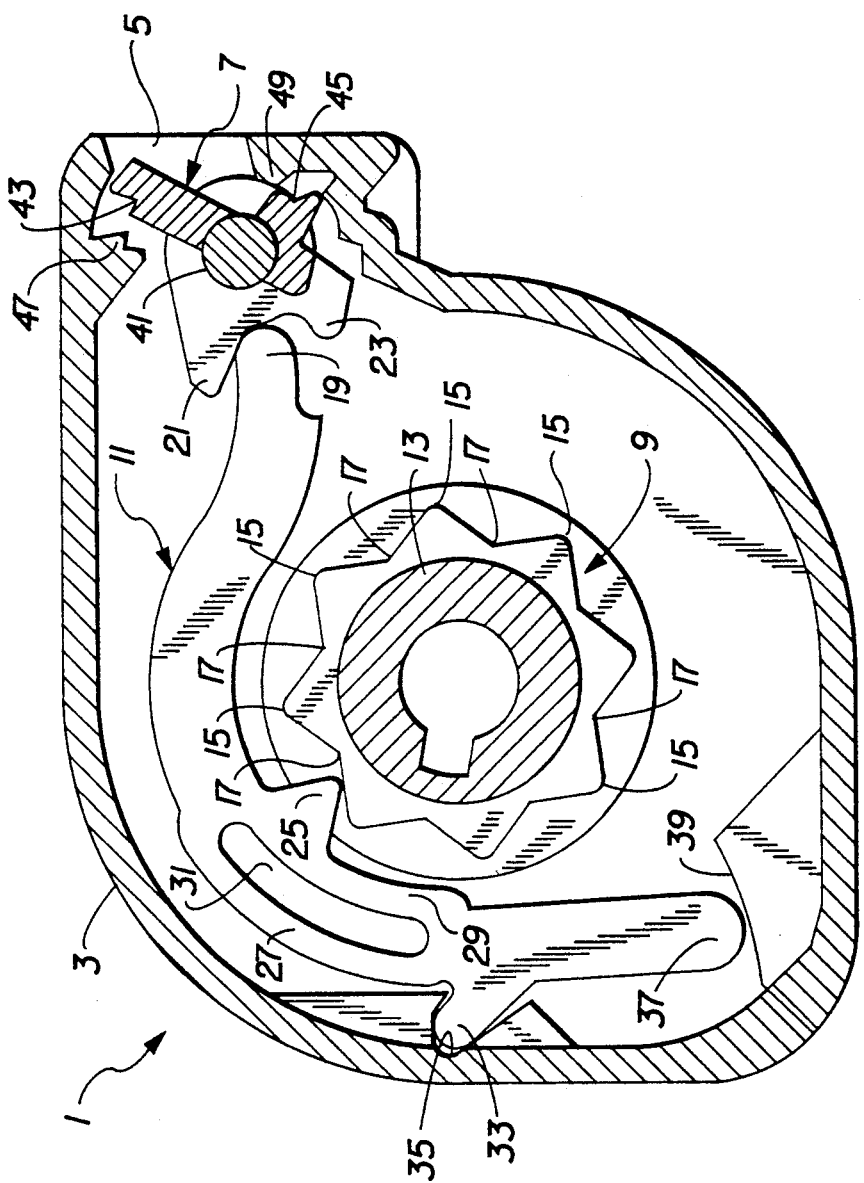
FIG. 2 is a sectional view similar to FIG. 1, showing the locking pawl disengaged from the film spool and the light shield substantially closed.
Figure 3:
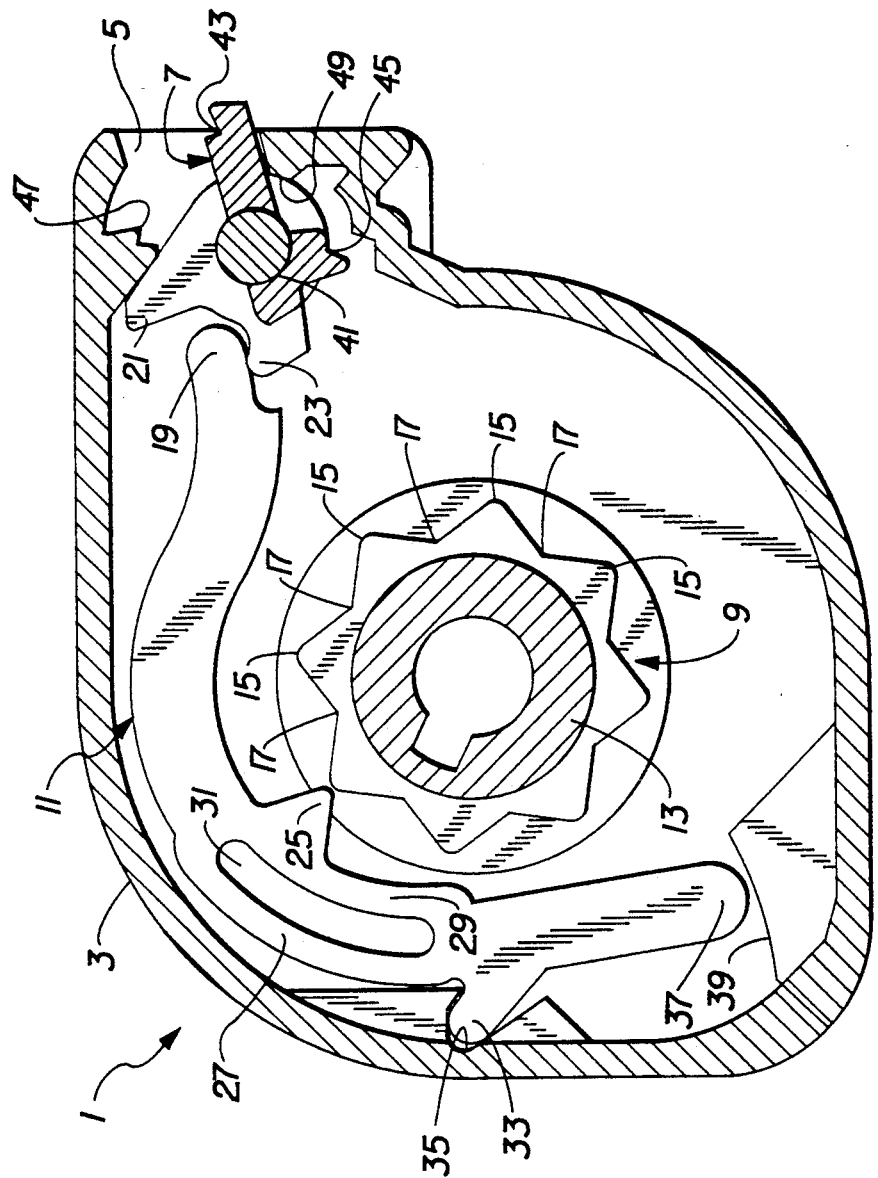
FIG. 3 is a sectional view similar to FIG. 1, showing the locking pawl disengaged from the film spool and the light shield completely opened.

Referring now to the drawings, FIGS. 1-3 show a film cassette 1 comprising a cassette shell or housing 3 with a film egress/ingress opening 5, a light shield 7 for preventing ambient light from entering the cassette interior through the film egress/ingress opening, a film spool 9 supported for rotation inside the cassette shell in film winding and unwinding directions W and U, and a locking pawl 11 for securing or arresting the spool to prevent its accidental rotation.

The film spool 9 has a spool core or hub 13 with a toothed periphery consisting of successive teeth 15 separated by respective interdental spaces 17. The teeth 15 are each identically symmetrically shaped. See FIG. 1.

The locking pawl 11 is a single-piece lever comprising an end portion 19 held in motion transmitting relation with the light shield 7 between a pair of spaced protuberances 21 and 23 that define a yoke-like portion of the light shield, a symmetrically shaped locking tooth 25 designed to fit in anyone of the interdental spaces 17 between two adjacent ones of the teeth 15 to secure or arrest the spool 9 to prevent its accidental rotation, resilient means in the form of a pair of flexure longitudinal edge portions 27 and 29 separated by a longitudinal hole 31 in the lever, a pivot protuberance 33 located in a socket 35 formed at the inside of the cassette shell 3, and a retaining leg 37 located opposite a stop 39 located along the inside of the shell.

The light shield 7 is a door which is supported for closing movement about an axis pin 41 to prevent ambient light from entering the cassette interior through the film egress/ingress opening 5 and for opening movement about the same pin to permit film movement out of and back into the cassette interior through the film egress/ingress opening.

Respective notches 43 and 45 are formed in the light shield 7 for receiving mating projections 47 and 49 on the inside of the cassette shell 3, when the light shield is completely closed as shown in FIG. 1, to releasably secure the light shield closed. Pivoting the light shield 7 to open discontinues engagement of the notches 43, 45 and the projections 47, 49 as shown in FIG. 3.

OPERATION

As can be appreciated by looking at FIGS. 1 and 2 the film spool 9 can be forcibly rotated in the unwinding or winding direction U or W to make either one of the two adjacent teeth 15 between which the locking tooth 25 is normally located eject or cam the locking tooth from the particular space 17 separating those two teeth. Consequently, the locking pawl 11 will be forced out of engagement with the spool 9 and the locking pawl will be slightly pivoted about its protuberance 33 located in the socket 35. Simultaneously, the flexure edge portions 27 and 29 will be deformed by the resulting compressive stress to the locking pawl 11 and the end portion 19 of the locking pawl will begin to push against the yoke-like portion defined by the protuberances 21 and 23 of the light shield 7 as shown in FIG. 2. Then, the flexure edge portions 27 and 29 will act as an over-center spring and recover their original shape as shown in FIG. 3. This further pivots the locking pawl 11 about its protuberance 33 located in the socket 35 to make its end portion 19 further push against the yoke-like portion defined by the protuberances 21 and 23 to open the light shield 7.

When the light shield 7 closed as shown in FIG. 1, its protuberance 21 will push against the end portion 19 of the locking pawl 11 to return the locking pawl to its original position.

The invention has been described with reference to a preferred embodiment. However, it will be appreciated that variations and modifications can be effected by a person of ordinary skill in the art without departing from the scope of the invention.

PARTS LIST FOR FIGS. 1-3

1. film cassette
3. cassette shell
5. film egress/ingress housing
9. film spool
U and W. film unwinding and winding direction
11. locking pawl
13. spool core
15. spool teeth
17. interdental spaces
19. lever end portion
21 and 23. light shield protuberances
25. locking tooth
27 and 29. lever edge portions
31. longitudinal hole
33. lever pivot protuberance
35. socket
37. lever retaining leg
39. stop
41. axis pin
43, 45. notches
47, 49. projections

What is claimed is:

1. A film cassette comprising a rotatable film spool, a light shield for preventing ambient light from entering the cassette, and a locking pawl movable into engagement with said spool to inhibit rotation of said spool but being forced out of engagement with said spool when said spool is rotated in a film unwinding direction, is characterized in that:
   said light shield is movable to open; and
   said locking pawl is arranged to move said light shield to open responsive to said locking pawl being forced out of engagement with said spool when said spool is rotated in the film unwinding direction.

2. A film cassette as recited in claim 1, wherein said locking pawl includes resilient means for first being temporarily deformed due to said locking pawl being forced out of engagement with said spool when said spool is rotated in the film unwinding direction and then automatically recovering its shape to change the position of said locking pawl to move said light shield to open.

3. A film cassette as recited in claim 1, wherein said locking pawl is a lever including an end portion held in motion transmitting relation with said light shield, a locking piece configured to engage said spool to inhibit rotation of said spool, and resilient means for first being temporarily deformed due to said locking piece being forced out of engagement with said spool when said spool is rotated in the film unwinding direction and then automatically recovering its shape to change the position of said end portion to move said light shield to open.

4. A film cassette as recited in claim 1, wherein said resilient means is a pair of longitudinal edge portions of said lever separated by a longitudinal hole in the lever.

5. A film cassette comprising a rotatable film spool, a light shield for preventing ambient light from entering the cassette, and a locking pawl movable into engagement with said spool to inhibit rotation of the spool but being forced out of engagement with said spool when said spool is rotated in a film unwinding direction, is characterized in that:
   said light shield is movable to open and to close; and
   said locking pawl is arranged in contact with said light shield to move said light shield to open responsive to said locking pawl being forced out of engagement with said spool when said spool is rotated in the film unwinding direction and to be moved by said light shield to re-engage said spool responsive to said light shield being moved to close.

6. A film cassette comprising a light shield for preventing ambient light from entering the cassette, is characterized in that:
   said light shield is movable to open; and
   over-center spring means is in contact with said light shield for first being temporarily deformed without opening said light shield and then automatically recovering its shape to move said light shield to open.

* * * * *